United States Patent [19]
Warrick et al.

[11] 3,800,399
[45] Apr. 2, 1974

[54] POWER DECAPSULATION AND RECOVERY METHOD AND APPARATUS

[76] Inventors: Ronald W. Warrick, 203 Meadowview Ln., Phoenixville, Pa. 19460; Robert N. Faust, 835 Mitchell Ave., Morton, Pa. 19070

[22] Filed: Sept. 5, 1972

[21] Appl. No.: 285,991

[52] U.S. Cl. ............ 29/426, 29/403, 53/29, 55/16, 141/110 R
[51] Int. Cl. ............................. B23p 19/00
[58] Field of Search .... 53/29; 141/5, 110 R, 110 X; 55/16 R, 15 R, 68, 158; 29/426, 427, 403

[56] References Cited
UNITED STATES PATENTS
3,609,937  10/1971  Merrill ................................. 53/29
2,569,410  9/1951  Craene ................................ 141/110
3,303,105  2/1967  Konikoff et al. ........................ 55/16

*Primary Examiner*—Charles W. Lanham
*Assistant Examiner*—James R. Duzan
*Attorney, Agent, or Firm*—Vito Victor Bellino; Joseph Martin Weigman

[57] ABSTRACT

The disclosure is directed to a method and an apparatus for recovering the contents of filled, closed, two component, hard gelatin capsules by inducing a higher pressure inside than outside of the capsules causing the gases inside the capsules to expand and force apart the body and cap components of the capsules. The contents may then be separated from the body and cap sections by well known means, such as screening and the like.

2 Claims, 3 Drawing Figures

POWER DECAPSULATION AND RECOVERY METHOD AND APPARATUS

This invention relates to a method and an apparatus for recovering the contents of filled, closed, two component, hard gelatin capsules. More particularly, this invention relates to a method and an apparatus in which such recovery is carried out by inducing a higher pressure inside than outside such capsules.

In the course of manufacture of any encapsulated pharmaceutical product, there are a number of rejected filled capsules. In many cases, recovery of the material inside the capsules is either not economically feasible or is not possible without alteration of initial physical properties of the material, such as bulk density, particle size, and the like.

The filling of powder into two component capsules does not significantly alter the properties of the powder. Although slightly compacted, the powder may be recovered with its original particle size and bulk density by separating the cap and body and emptying out the powder. The powder may then be replaced in the filling machine and re-encapsulated.

In spite of the apparent simplicity of the steps involved only infrequent attempts have been made in the past to recover powder from rejected capsules. Manual separation of the capsules is precluded by the high ratio of cost of labor to the value of recovered material.

Chemical recovery is practiced on some penicillin products by recrystallization of the active ingredient as a raw material. The raw material must be reprocessed by combining with other ingredients to produce a material suitable for re-encapsulation. Chemical methods of recovery pose the disadvantages of recovering only the active ingredient rather than a formulation, or granulation, which is immediately reusable. The recovered material must be reformulated before being re-encapsulated.

Mechanical recovery as presently known and practiced requires milling the rejected capsules to produce a mixture of capsule contents and fragments of the hard gelatin capsule shell. The gelatin fragments that are larger than the granulation particles are screened out. Very often, however, the gelatin fragments are of comparable size to the granulation particles. In order to recover gelatin-free material, a portion of the recovered material must be screened out with the gelatin and discarded. This in turn results in loss of control of bulk density and usually causes assay variations in the recovered material. The recovered material must be reformulated before being re-encapsulated.

The closest known prior art is U.S. Pat. No. 3,609,937 which describes a method of testing the integrity of plastic capsules having a flawless, continuous (one component) shell by effusing an inert gas into each capsule and then reducing the outside pressure. Defective capsules explode. Acceptable capsules inflate and may be separated by flotation or screening. There is no teaching or suggestion that the method may be applied to two component, hard gelatin capsules.

It is an object of the present invention to provide a method of recovering the contents of filled, closed, two component, hard gelatin capsules in a form suitable for re-encapsulation without significant reformulation.

It is another object of this invention to provide apparatus for the recovery of the contents of filled, closed, two component, hard gelatin capsules.

It is another object of this invention to provide a method and apparatus for opening hard gelatin capsules for the purpose of recovering and reusing the contained material without reformulation.

Other and further objects of this invention will be apparent to those skilled in the art by reading the following description in conjunction with the attached drawings which:

Figure 1:
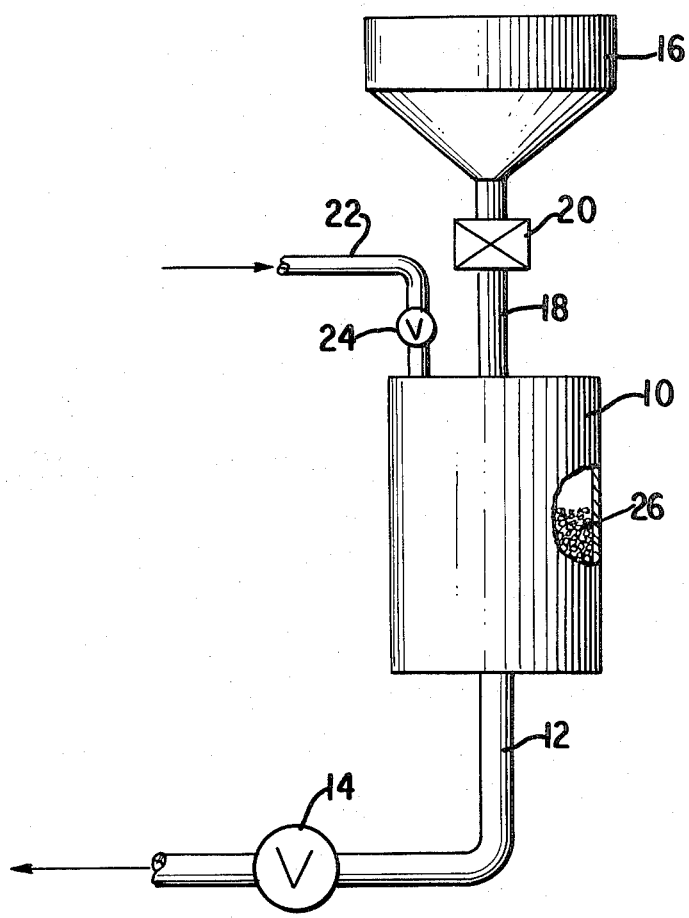
FIG. 1 is a schematic diagram of apparatus embodying the principles of the present invention.

The objects of the present invention may be achieved by the creation of a pressure differential between the inside of closed, two component, hard gelatin capsules and the surroundings, the higher pressure being that inside the capsules. To accomplish this, the capsules may be charged into a sealed vessel 10, as shown in FIG. 1, having a discharge conduit 12 and isolation valve 14 through a hopper 16 and a conduit 18. An airlock 20, in conduit 18 is closed and a dry pressurizing fluid, such as air, is admitted from a source, not shown, through conduit 22 controlled by valve 24. The vessel 10 is pressurized to 15–100 pounds per square inch, absolute, (psia). The pressurizing fluid permeates the walls of the capsules, shown as a bed 26, producing a corresponding pressurization within the closed capsules to a pressure equal to that inside the vessel 10. Typically this takes place in about one to sixty seconds.

The isolation valve 14 is then quickly opened and the vessel pressure reduced to 0–15 psia to create a differential pressure between the capsule interior and the capsule exterior of at least 10 psi. The expansion of the pressurizing fluid contained in each of the closed capsules due to this pressure differential causes the body and cap of sections of the capsule to separate. In the case of capsules which are closed abnormally tightly due to jamming, deformation of cap or body, or splits in the shell, opening may occur by rupture of the shell rather than by separation of the cap and body.

The novelty of the process lies in the indirect pressurization of the space inside the closed capsule by pressurization of the surroundings and subsequent depressurization of the surroundings. Within this description, several variations from the technique described above are possible. The capsules may be placed in the sealed container to be pressurized and then blown from the container with the exhausted air as shown in FIG. 1. The exhaust valve 14 is closed during pressurization and opened to allow rapid depressurization and to allow the capsules and powder to be pneumatically transported to a separate receptacle, not shown.

Figure 2:
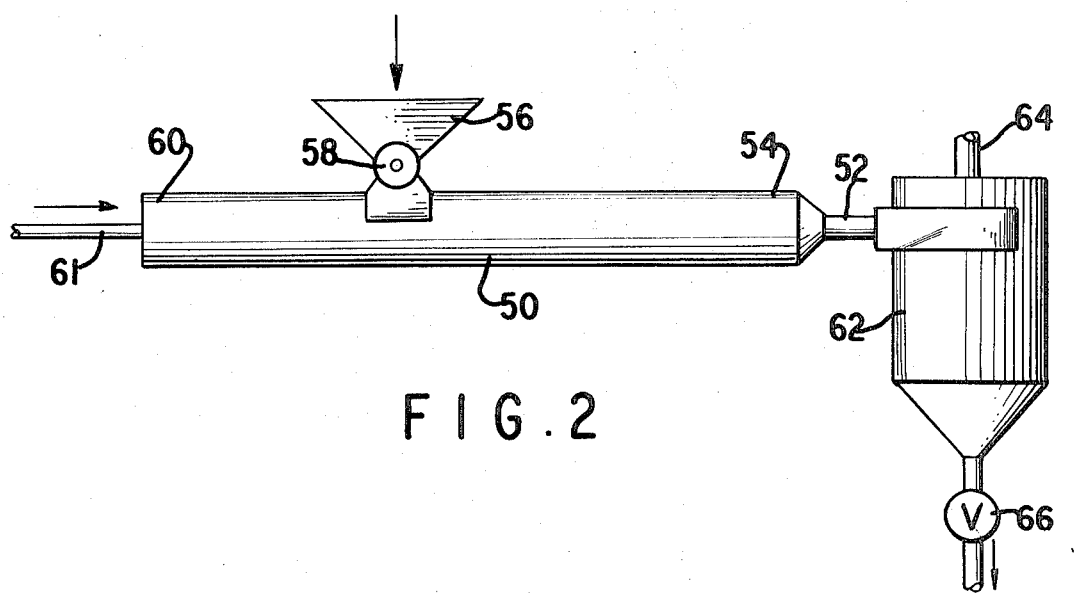
FIG. 2 is a schematic diagram of a continuous apparatus embodying the principles of the present invention.

An alternate embodiment for continuous processing is shown in FIG. 2. A transporting conduit 50 is fitted with a nozzle, or restrictive orifice, 52 at its discharge end portion 54. Capsules are charged into a hopper 56 and fed by a gas tight, rotary vane feeder 58 into the transporting conduit 50. A dry pressurizing fluid, such as air is introduced through conduit 61 into the transporting conduit 50 at its inlet portion 60 at 55–100 psia. The discharge nozzle 52 serves to maintain pressure within the conduit 50, but allows the pressurizing fluid and filled capsules to exit into low pressure surroundings downstream from the nozzle, such as receiver 62 which may be a cyclone separator. The receiver 62 is open to the atmosphere through vent 64. The internal pressure separates the two capsule components in the receiver. The receiver 62 is used for storage of opened capsules and granulation which may be discharged through valve 66 when desired.

Figure 3:
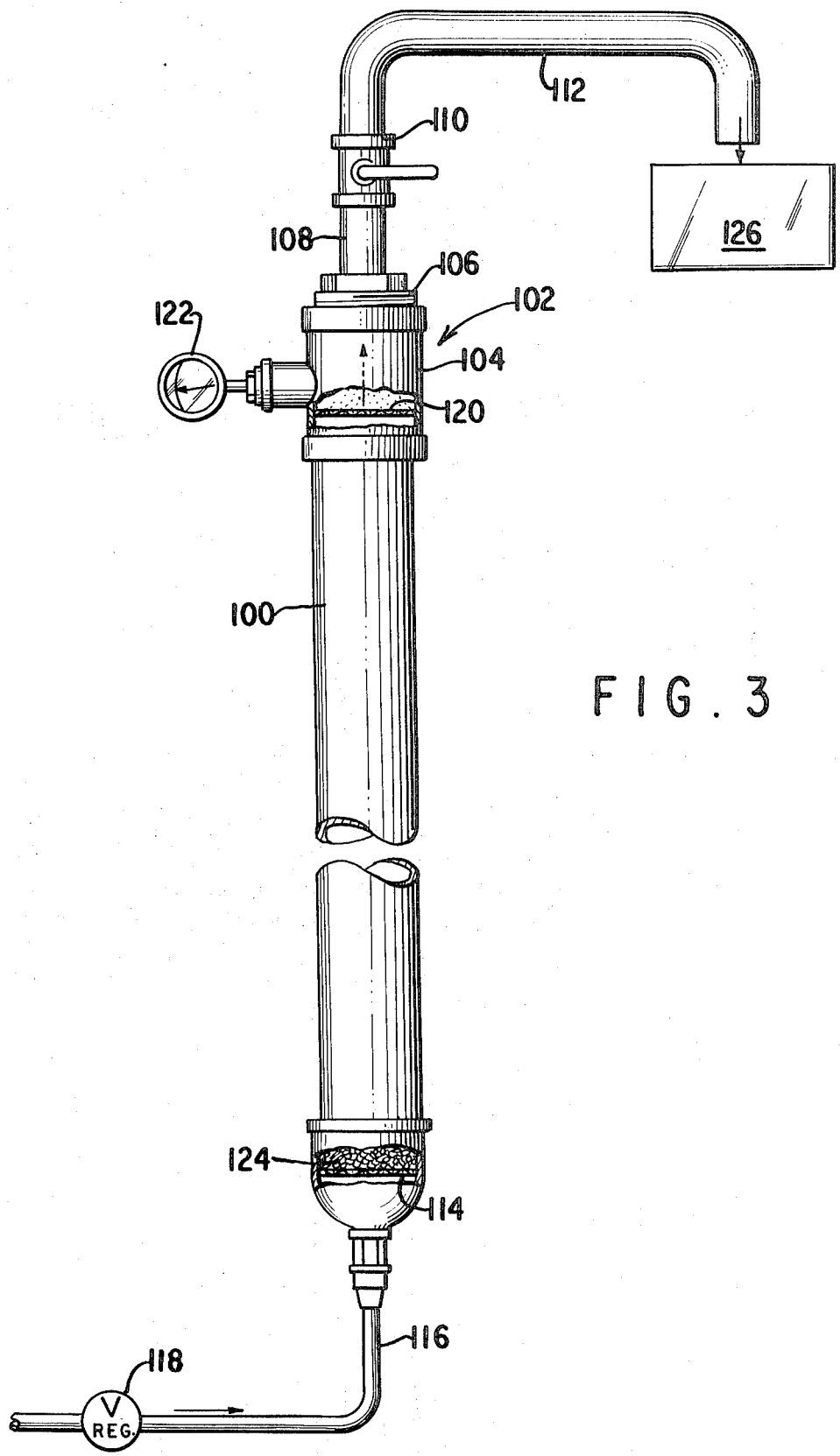
FIG. 3 is an elevational view of a preferred embodiment of apparatus employing the principles of the present invention.

A preferred embodiment of the apparatus is shown in FIG. 3. The apparatus comprises a cylindrical vessel 100, typically a 2-inch schedule 40 black iron pipe about 3 feet long. Air is supplied to the vessel 100 from a source of air supply, not shown, through conduit 116 fitted with a pressure regulator 118 having a range of about 0 to 100 pounds per square inch, gauge, (psig). The upper section of the pressure vessel is fitted with a removable closure means 102, typically a pipe tee 104, a reducer 106, a nipple 108, a quick-opening valve 110 and a discharge conduit 112. The pressure vessel 100 is fitted with a capsule retaining screen 114. The tee 104 is also fitted with a capsule retaining screen 120. The tee may also be fitted with a pressure gauge 122.

In operation the closure means 102 is removed, and the vessel 100 is filled about half full with capsules 124. The closure means is then reconnected. The valve 110 is closed and the pressure regulator is set at 40 to 100 psig. Air is then introduced into the closed vessel 100 until the pressure in the vessel reaches the set pressure of the regulator. The air supply is then cut off, and the valve 110 is opened as rapidly as possible to depressurize the container and open the capsules. The process may be repeated as often as necessary to assure opening of as many capsules as possible. The upper capsule retaining screen 120 prevents the capsules from being forced out of the container by expanding air. Once the capsules are open the air supply from the air supply line 116 blows granulation from the pressure vessel through conduit 112 into a suitable receiver 126 while the empty capsules are retained by the upper capsule retaining screen 120. The air supply is then cut off, the closure means removed and the emptied capsules removed separate from the recovered granulation.

We claim:

1. A method of recovery of the contents of filled, closed, two component, hard gelatin capsules comprising the steps of:
   A. Charging the filled, hard gelatin, closed capsules into a pressure vessel;
   B. Increasing the pressure inside said vessel to 15 to 100 pounds per square inch absolute;
   C. Maintaining said pressure in said vessel for a period of 1 to 60 seconds until the internal pressure inside said capsules is substantially equal to the pressure surrounding said capsules;
   D. Rapidly reducing the pressure in said vessel whereby said internal gas pressure causes the body and cap sections of said capsules to separate; and
   E. Separating said powder from said capsule components by air blast sifting.

2. A device for opening filled, closed, two component hard gelatin capsules comprising in combination:
   A. A pressurizable vessel;
   B. Means to charge filled capsules into said vessel;
   C. Dry fluid means to raise the pressure of the interior of said vessel whereby the interior pressure of each of said capsules is also raised;
   D. Means to rapidly reduce the pressure in said vessel whereby said interior pressure of said capsules pushes apart the cap and the body components of said capsules; and
   E. Air blast separating apparatus to separate said powder from said cap and body components.

* * * * *